(12) United States Patent (10) Patent No.: US 8,392,122 B2
Szu (45) Date of Patent: Mar. 5, 2013

(54) NOWCAST OF NATURAL RESOURCE AND CALAMITY WARNING

(76) Inventor: Harold Szu, Potomac, MD (US)

( * ) Notice: Subject to any disclaimer, the term of this patent is extended or adjusted under 35 U.S.C. 154(b) by 407 days.

(21) Appl. No.: 12/756,621

(22) Filed: Apr. 8, 2010

(65) Prior Publication Data

US 2010/0274493 A1    Oct. 28, 2010

Related U.S. Application Data

(60) Provisional application No. 61/168,412, filed on Apr. 10, 2009.

(51) Int. Cl.
*G01V 1/00* (2006.01)
(52) U.S. Cl. .......................................................... 702/15
(58) Field of Classification Search .................... 702/15, 702/13, 14, 182–185, 188
See application file for complete search history.

(56) References Cited

U.S. PATENT DOCUMENTS 7,277,797 B1 *  10/2007  Kunitsyn et al. ................ 702/15

* cited by examiner

*Primary Examiner* — Edward Raymond
(74) *Attorney, Agent, or Firm* — IP Strategies

(57) ABSTRACT

A method of forecasting naturally-occurring phenomena, such as seismic activity, includes taking localized measurements of the Earth's gravitational force change using MEM inertial motion units. Trends in the measurements are interpreted and related to a phenomenon of interest, a likelihood of occurrence is predicted based on the relationship, and the likelihood is reported to interested parties, preferably automatically to emergency bulletin sources. Measurements can be taken from above the Earth's atmosphere. The trends can be interpreted by determining blind source separation information directed to the region underneath the Earth's mantle crust to determine composition and/or movement.

28 Claims, 12 Drawing Sheets

US 8,392,122 B2

NOWCAST OF NATURAL RESOURCE AND CALAMITY WARNING

CROSS REFERENCE TO RELATED APPLICATIONS AND PATENTS

This is related to, and claims priority from, U.S. Provisional Application for Patent No. 61/168,412, which was filed on Apr. 10, 2009. This is also related to U.S. Pat. No. 7,355,182, issued on Apr. 8, 2008, and U.S. Pat. No. 7,366,564, issued on Apr. 29, 2008.

FIELD OF THE INVENTION

The present invention relates to systems and methods of observing, reporting, and predicting natural phenomena.

BACKGROUND OF THE INVENTION

It is not surprising that the earthquakes happen at clashing tectonic plate boundaries, where numerous earthquake stations exist. However, there is a need for more such stations, which collect and record seismographic data in an effort to predict earthquake activity. The surprising significance of the recent Sichuan and Tongshan earthquakes in China, which showed that major earthquakes of logarithmic Richter scale readings beyond 7 can happen within a single tectonic plate rather than at a boundary, should serve as a wakeup call. That is, plate border surveillance should be broadened to additional areas of coverage within plate boundaries. Judging by the success of an archival survey of NASA data with respect to gravitational potential by Liu et al., the following presents a unified earthquake theory covering both the peripheral and the central plate regions, to provide a framework for comprehensive global surveillance of natural calamities in terrestrial and extraterrestrial space.

The following will establish the experimental fact of the existence of a fireball in the center of the earth's core.

The solid metal fire ball Earth core model (Oldham 1906) was verified by a seismic earthquake wave on Feb. 22, 2006 propagated from Japan through the Earth's core to Mozambique. See FIGS. 1-3. A relative slowness of about 1.5 seconds was recorded upon arrival, at $M_w=7.0$ [Wookey & Helffrich, Nature V. 454, no. 7206, pp. 873-876, 14 Aug. 2008]. The Hermitian wavelet de-noise algorithm $H(t)=\text{Mexican\_hat}_{even}(t)+i\,\text{Mexican\_hat}_{odd}(t)$ $$\text{Mexican\_hat}_{odd}(t) = \exp\left(-\frac{r^0}{\alpha}\right)t$$

$$\text{Mexican\_hat}_{even}(t) = \exp\left(-\frac{c^0}{\alpha}\right)(1 - t^2)$$

A unified theory of earthquakes due to the existence of the fireball in the center of the Earth's core is established as follows. The crust on the Earth's surface, like a kitchen kettle lid, tightly covers the melted mantle rock layer, like pea soup cooking in the kettle. Given time, the mantle layer will bubble, rattle, and shake, according to the Bernard instability principle. This instability is universal for any liquid state of matter being heated from below, if and only if it has a real, positive thermal expansion coefficient. Likewise, the Earth's mantle is being cooked from below by an enormously hot fireball that is approximately the size of the Earth's moon. The heat comes from radioactive decay that has been confined within the core for over an eon. Due to the enormous gravitational attraction that is always real, positive, and additive, the inner core is bifurcated into 2 regions, a heat-melted liquid metal region, where the Earth's magnetic field is produced as predicted by Faraday induction law, and, further inside, a tightly-squeezed solid metal ball region, due to gigantic weight compression, as confirmed by sonar experiments. The complexity of Earth's Bernard instability is due to the extra-rotational Coriolis acceleration, $A=2\omega\times v$, where $\omega$ is the number of revolutions per 24 hours, that makes the up-down thermal convection act west-east sideways, respectively, creating a local regional mass imbalance along gravitational force radial directions and permitting feasible in-situ measurements at a distance along the radial directions.

$$(\dot{r})_o = v + (\dot{x}i + \dot{y}j + \dot{z}k) = v + \omega x r \tag{1}$$

$$\left(\frac{d}{dt}\right)_0 = \left(\frac{d}{dt}\right) + (\omega x\;) \tag{2}$$

BRIEF DESCRIPTION OF THE INVENTION

According to an aspect of the invention, a method of forecasting naturally-occurring phenomena includes taking localized measurements of the earth's gravitational force change. Trends in the measurements are interpreted, the trends are related to a naturally-occurring phenomenon of interest, a likelihood of occurrence of the phenomenon of interest is predicted based on the relationship, and the likelihood of occurrence is reported to interested parties, preferably automatically.

The naturally-occurring phenomenon of interest can be, for example, seismic activity.

Taking localized measurements of the earth's gravitational force change can include using inertial motion units to measure local changes. The inertial motion units can be, for example, miniaturized inertial motion units, such as micro-electro-mechanical devices.

Taking localized measurements of the earth's gravitational force change can include taking measurements from a point above the Earth's surface, such as from above the Earth's atmosphere.

Reporting on the likelihood of occurrence can include reporting via a wired communication system or via a wireless communication system, such as a cellular telephone network.

Interpreting trends in the measurements can include determining blind source separation information directed to the region underneath the Earth's mantle crust. In this case, the blind source separation information can be used to make determinations regarding composition and/or movement below the Earth's mantle crust. Reporting on the likelihood of occurrence to interested parties can include providing information regarding potential seismic activity as forecast information to emergency bulletin sources.

According to another aspect of the invention, an apparatus adapted to forecast naturally-occurring phenomena includes a device adapted to take localized measurements of the earth's gravitational force change, a computing device including instructions to interpret trends in the measurements, to relate the trends to a naturally-occurring phenomenon of interest, and to predict a likelihood of occurrence of the phenomenon of interest based on the relationship, and a communications system adapted to report, preferably automatically, on the likelihood of occurrence to interested parties.

For example, the naturally-occurring phenomenon of interest can be seismic activity.

The device adapted to take localized measurements of the earth's gravitational force change can include an inertial motion unit, preferably a miniaturized inertial motion unit, such as a micro-electro-mechanical device.

The device adapted to take localized measurements of the earth's gravitational force change can be disposed at a point above the Earth's surface, for example, above the Earth's atmosphere.

The communications system can include a wired communication system and/or a wireless communication system, such as a cellular telephone network. The communications system can also include emergency bulletin sources.

The instructions to interpret trends in the measurements can include instructions to determine blind source separation information directed to the region underneath the Earth's mantle crust. In this case, the instructions to relate the trends to a naturally-occurring phenomenon of interest can include instructions to use the blind source separation information to make determinations regarding composition and/or movement below the Earth's mantle crust.

DETAILED DESCRIPTION OF THE INVENTION

A real-time wide-area persistent surveillance system serves as an earthquake Nowcast System in terrestrial and extraterrestrial space. This system is a real-time data acquisition system based on data collected from a distributed set of sensitive Inertial Motion Units (IMUs) embedded in the miniature technology of Micro Electric Mechanical Systems (MEMSs). Stations within the system watch for any diminishing of gravitational pull upon a set of passing or flying-over test-masses, such as spherical masses in the shape of, for example, a golf ball, due to the up-dwelling of much hotter and less dense melted mantle mass. The imbalanced proofing masses squeeze neighboring deformable piezoelectric materials, generating read-out currents, much as IMUs are utilized in automotive airbag systems. The currents feed an onboard mini-supercomputer that applies a Blind Sources Separation (BSS) smart algorithm $$\overline{X}(t) = [A(\overline{x},t)7]S(t)7 \tag{3}$$

solving the percentage of hot mass S(t) under the foot-print without knowing the system transfer function $[A\overline{x},t)7]$. Thus, one imposes the constraint of isothermal equilibrium physics at the minimum Helmholtz free energy [U.S. Pat. No. 7,355, 182, the disclosure of which is incorporated herein]. In cases of space-invariant [A(t)], we apply the Independent Component (pixel-density) Analysis (ICA) based on the smoothness of higher order of statistics (HOS) [U.S. Pat. No. 7,366,564, the disclosure of which is incorporated herein]. These two classes of BSSs may happen in a localized crust stress singularity for earthquakes and tsunami, including magnetic N-S pole fluctuations and reversals.

Figure 1:
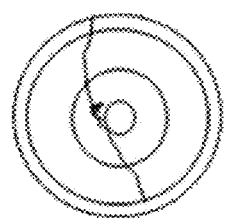
FIG. 1 is a rendering of a seismic earthquake wave propagated from Japan through the Earth's core to Mozambique.
Figure 2:
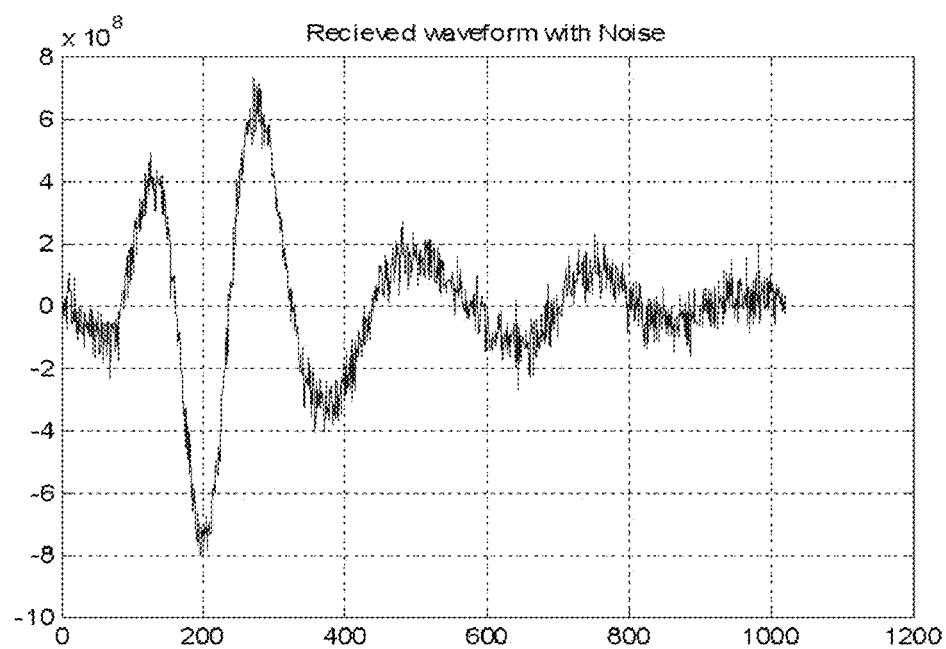
FIGS. 2 and 3 are graphs of the received waveform of FIG. 1.
Figure 3:
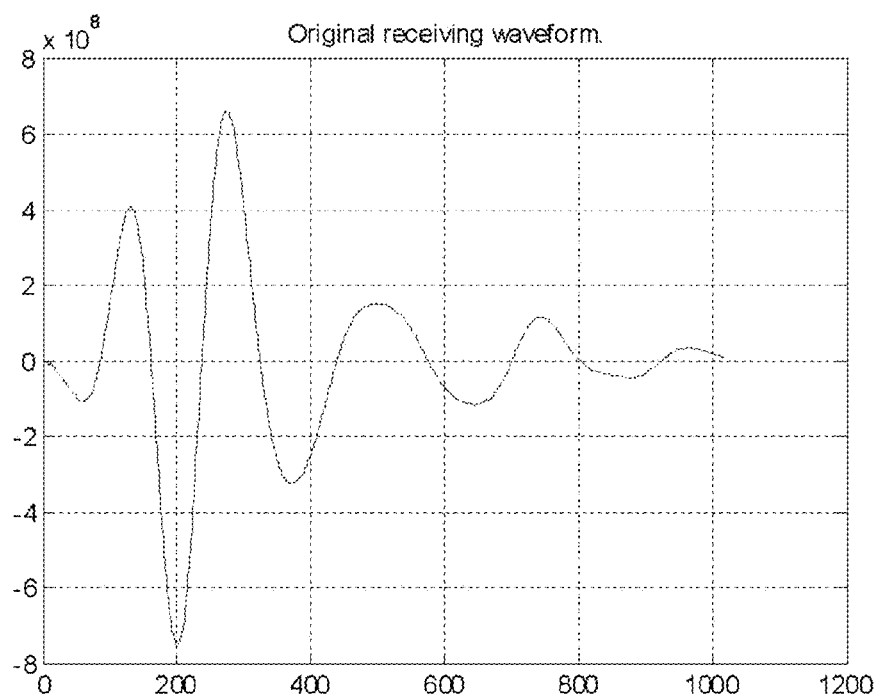
Figure 4:
FIG. 4 is a map showing the location of the San Andreas Fault.
Figure 5:
FIG. 5 is a photograph of a portion of the San Andreas Fault.
Figure 6:
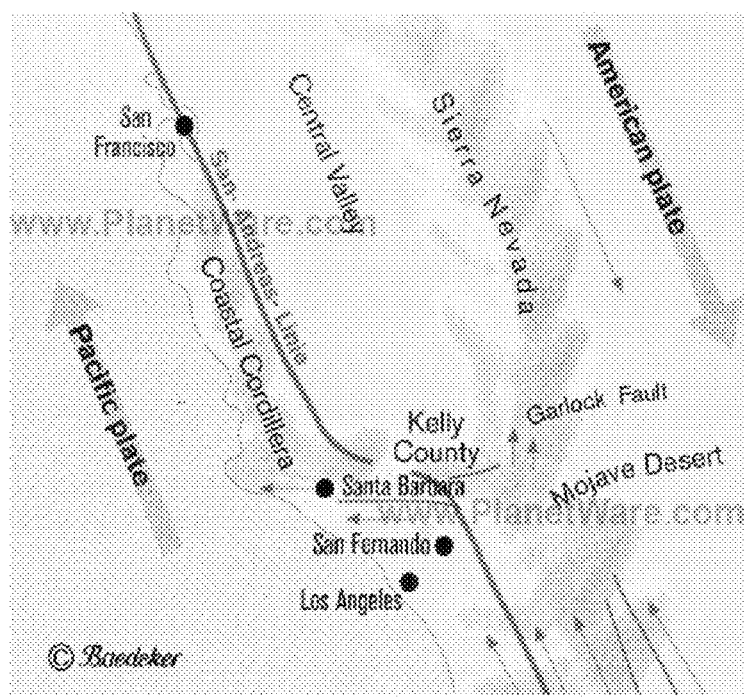
FIGS. 6 and 7 are close-up maps of portions of the San Andreas Fault.
Figure 7:
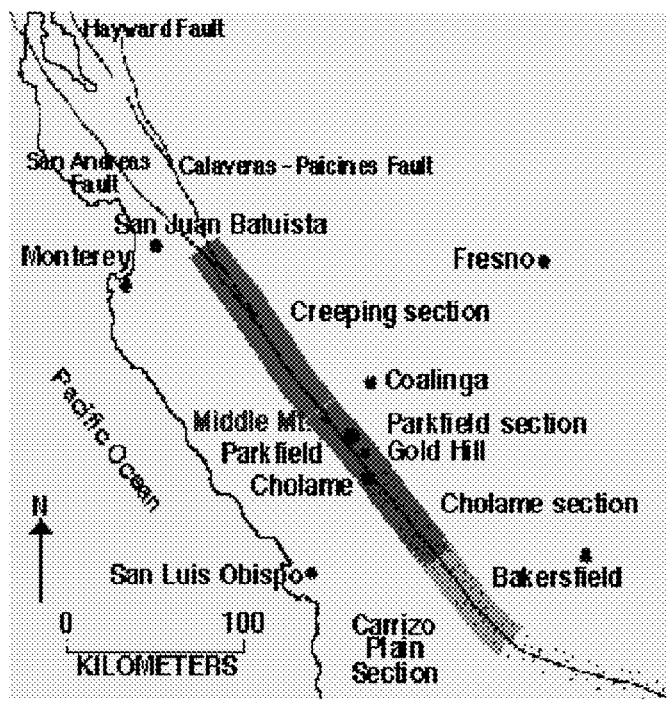
Figure 8:
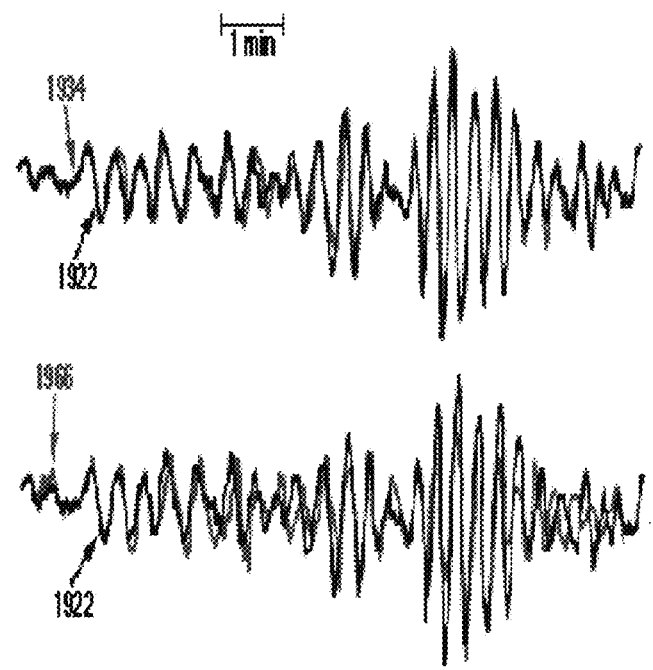
FIGS. 8 and 9 show particular seismic activity at the Parkfield site.
Figure 9:
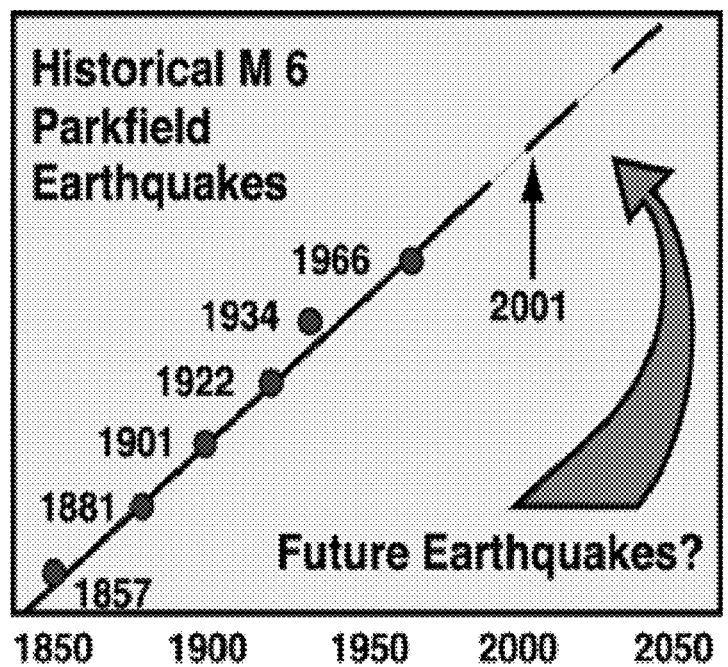

The device SWaP (Size, Weight and Power) must include the cost of the necessary computing power. Scanning SWaP within the payload cargo constraint for observation platform includes (i) a massively-distributed number of terrestrial tower poles, such as television towers, cellular phone towers, power-line towers, lamp posts, or dedicated towers, or (ii) an extra-terrestrial space station. Both platforms work with local in-situ seismic observations, when the ground truth is used to calibrate for the spatiotemporal vector time series for BSS prediction. For example, it would be advantageous to install test beds on cellular phone towers over the earthquake zone in Italy and in the US along the San Andreas Fault in California. See FIGS. 4-7. FIGS. 8 and 9 show particular seismic activity at the Parkfield site.

The test bed can help accurately now-cast a natural calamity using a powerful computer and precise modeling of the Earth's mantle convection stress model. Calamity forecasting works similarly to the accurate weather Nowcast system, based on a few days' persistency of chaotic weather correlation following the high/low pressure geo-circulation flow direction. An earthquake has a number of potential causes:

(i) An active cause is due to the thermodynamic Bernard instability that applies to any material having a positive thermal expansion coefficient. The Earth's fireball core, the size of the moon, is gravitationally squeezed into a solid metal ball that has trapped within it heat from radioactive decay over eons. Consequently, the Earth's surface crust and melted mantle are constantly heated from below. Remote but in-situ measurement according to the invention is possible, however, because of the gravitational mass imbalance generated by the daily rotation spin of the earth, the Coriolis force, that can separate the up-rising warmer and lighter mantle to the east (in the northern hemisphere) from the colder and heavier mantle downward-dwelling to the west (in the northern hemisphere) toward the center of the Earth's fireball metal core.

(ii) A reactive cause is tectonic plate crust instability due to inter-plate clashing stress or intra-plate geological fault. While theses reactive causes have been confirmed by earth-bound seismic wave measurement, in-situ terrestrial and extraterrestrial space measurement according to the invention can serve as a forecast warning.

Figure 10:
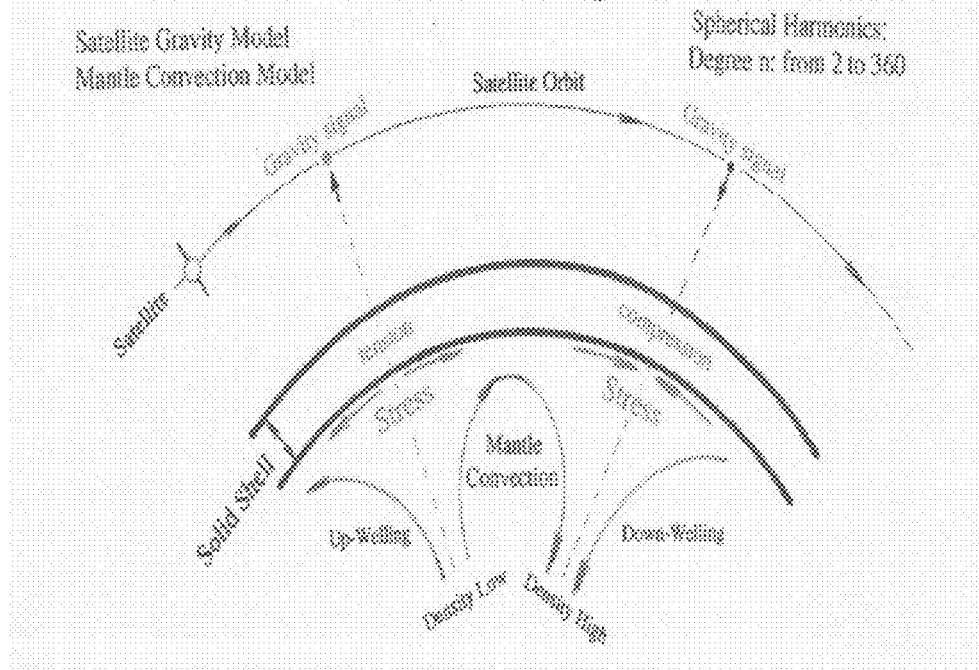
FIG. 10 shows an overview of the system of the invention.

(iii) A now-cast at a region A will become a forecast to the west of the region A due to the causality relationship of the Coriolis force thermal convection loop path that separates the sinking of the colder and heavier mass to the east and the rising of warmer and lighter mass to the west that generates a net mass imbalance, permitting in-situ measurements at a distance. See FIG. 10.

Theory

MEMS/IMU designs are guided by a set of theorems as follows:

Theorem 1

Independent of the proofing mass used in the IMU/MEMS, one can measure Earth's mass perturbation Proof:

Isaac Newton:

$$F = \gamma m_1 m_2 / r^2 \text{ where } \gamma = 6.67 \times 10^{-8} \text{gm}^{-1} \text{cm}^3 \text{sec}^{-2}$$

$$m\ddot{\vec{r}} = -\gamma \vec{r} mM/r^3$$

$$\ddot{\vec{r}} = -\gamma \vec{r} M/r^3$$

$$M = \int \iiint \rho(\vec{x}, t) d^3\vec{x}\, dt; \text{ partial mass } m' = m_o + \Delta m$$

Q.E.D.

Theorem 2

Radial Footprint: The orbital perturbations are generated by the Earth's mass along radial directions.

Proof:

$$\dot{\vec{r}} = \dot{r}\hat{1}_r + r\dot{\phi}\hat{1}_\phi;$$

$$\ddot{\vec{r}} = (\ddot{r} - r\dot{\phi}^2)\vec{1}_r + (2\dot{r}\dot{\phi} + r\ddot{\phi})\vec{1}_\phi = -\gamma M/r^2 \vec{1}_r$$

$$\ddot{r} = -\gamma M/r^2 + H^2/r^3$$

$$r^2 \dot{\phi} = \text{const.} H;$$

$$\dot{\phi} = H/r^2$$

While the transformation $w = u - \gamma M/H^2$ led to Kepler solutions

This leads to the solution that the perturbation occurs only along radial directions $$r = r_o + \Delta r = r_o(1 + \Delta r/r_o)$$

$$\ddot{r}_o = -\gamma M_o/r_o^2 + H^2/r_o^3$$

$$\Delta \ddot{r} = -(\gamma M_o/r_o^2)(\Delta M/M_o - 2\Delta r/r_o) + H^2/r_o^3(-3\Delta r/r_o)$$

Q.E.D.

Theorem 3:

Fixed time-interval integration can give an orbital-invariant measurement of the dynamics of convection mass perturbation over time.

Proof:

Kepler's $2^{nd}$ law says that orbit weeping is equal to angular area in equal time, suggests a time integration methodology of a fixed time-interval for the dynamic mantle convective mass perturbation over time, since an equal coverage of Earth's surface area in equal time for whatever conic shape of the specific orbit may be.

Q.E.D.

Discussion

Complexity is introduced due to melted mantle convection in a large non-radial loop of unknown diameter and thickness of the mass involved. The convection mantle loop in the northern hemisphere is counter-clockwise due to the western upward-dwelling force hitting with unknown strength upon the inter/intra tectonic plate(s) as a persistent warning signal, while the mantle loop is continuously sinking to the eastward downward path, releasing the pressure. The earth has three layers:

$$M_o = \int (\rho_{III}(\vec{r}) + \rho_{II}(\vec{r}) + \rho_I(\vec{r})) d\vec{r}$$

While the perturbation comes from the second melted mantle layer $$\Delta M(t) = \int \rho_{II}(\vec{r}, t) d\vec{r} \qquad (5)$$

The complexity is mainly due to the dependent convection loop of melted rock having heterogeneous layers: solid crust, molten mantle, magnetic field core, and fireball.

It may be circumvented by a set of distributed measurements of a set of IMU proofing masses embodied in the MEMS in space.

Thus, a local mass perturbation network approach is taken for the in-situ three-layer I,II,III calculation.

Figure 11:
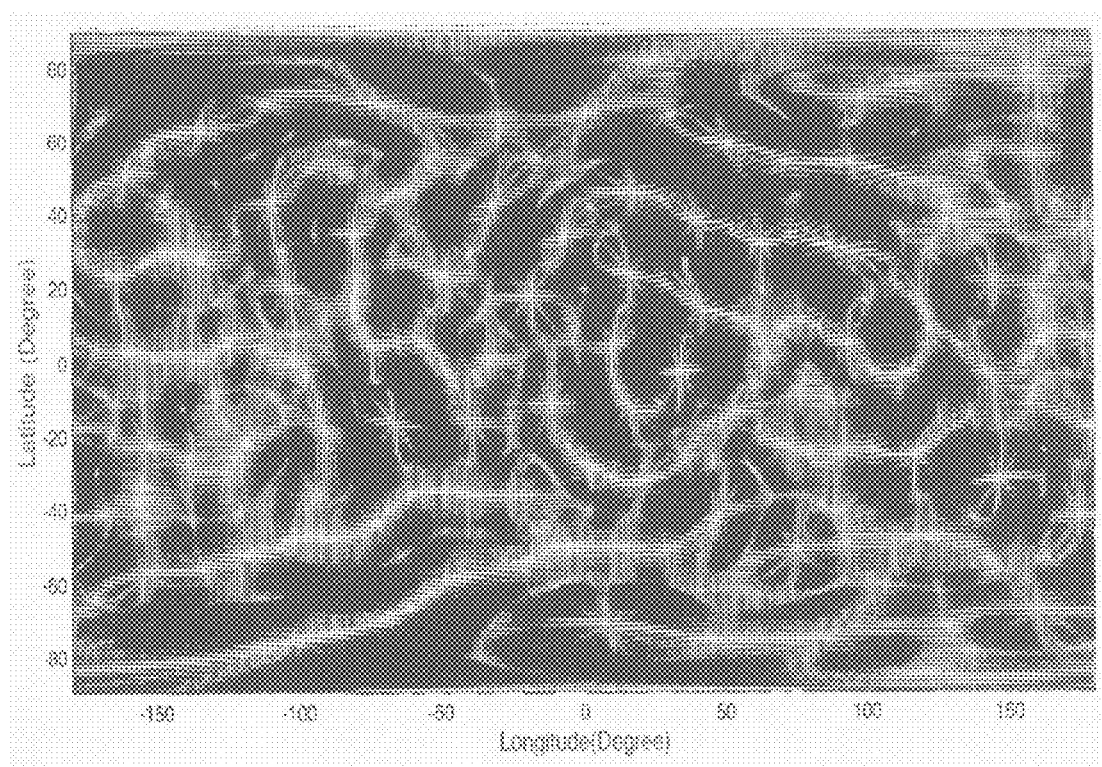
FIG. 11 is a diagram showing the Global Stress Distribution (40 Km below the surface of the Earth).
Figure 12:
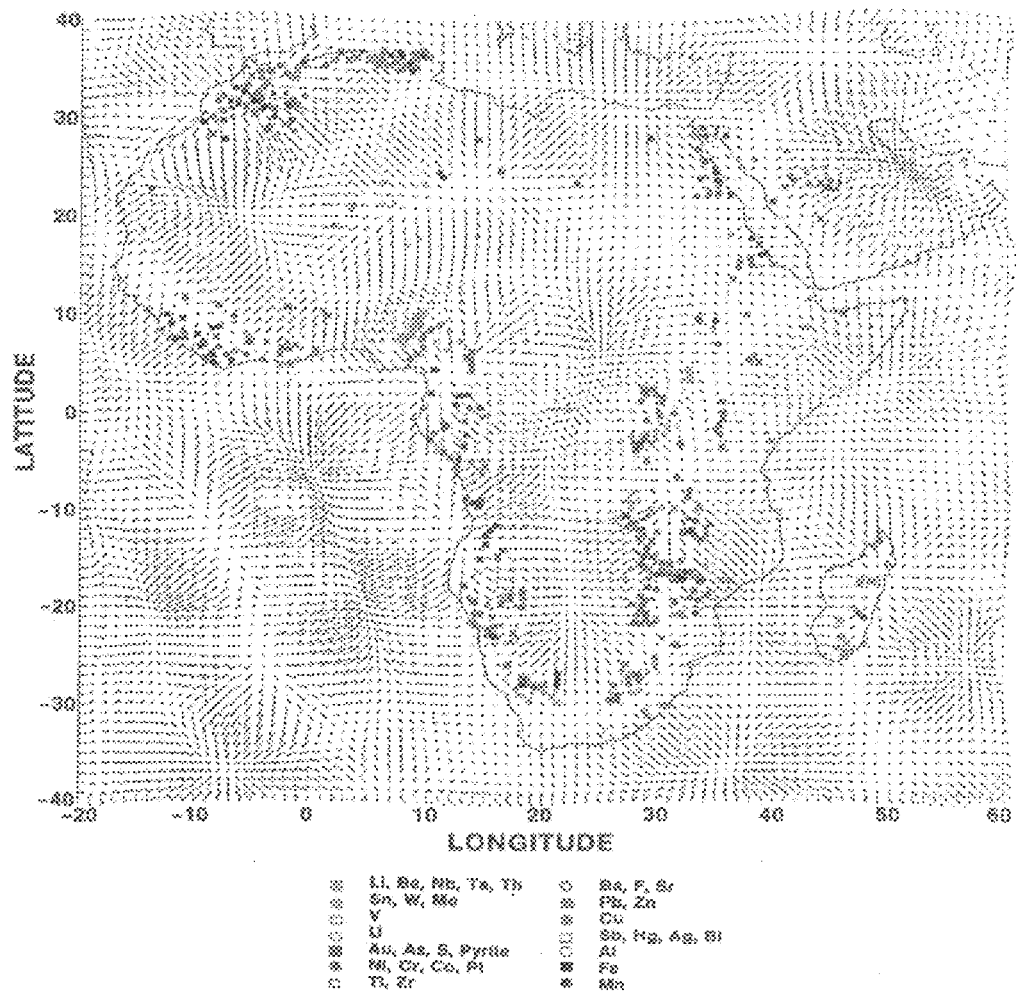
FIG. 12 is a diagram showing 450 Principal ore deposits in Africa that are clustered and exposed by the tensional stress regimes in the crust, respectively.

The impact of the system of the invention goes beyond the provision of an earthquake nowcast; it also provides more detail in-situ confirmation of a local mineral distribution. For example, see FIGS. 11 and 12, showing the Global Stress Distribution (40 Km below the surface of the Earth), and 450 Principal ore deposits in Africa are clustered and exposed by the tensional stress regimes in the crust, respectively.

Example

The triggering mechanism of a car airbag is simple in concept, low in mass-production cost, and failure-free in the world-wide usage. A central processor unit (CPU) monitors a number of sensors within the car. The preferred key sensor that embodied in the earthquake calamity warning nowcast system of the invention is a gravitational Accelerometer Unit (g-AU) oriented along the radial z-direction z(t), and therefore other car airbag sensors, such as the brake and seat occupancy sensors, will be ignored in this example. When a prerequisite threshold has been exceeded, the CPU will trigger the ignition of an explosive element to inflate a nylon fabric bag rapidly and will simply send the annotated time series data stream through the simplified cellular-like L-band transceiver.

The miniature g-AU consists of a small proof mass attached on a cantilever spring, and a position detector. Under steady state conditions, the proof mass experiencing a constant acceleration will move from its rest position to a new position determined by the balance between its mass times the acceleration and the restoring force of the spring. Under collision conditions, the sudden deceleration will trigger the threshold of CPU logic for detonation.

Semiconductor manufacturing technologies enable development and mass manufacturing of various sensors and actuators using state of the art technologies. Devices having an operation principle based on use of miniature mechanical elements, are denoted as Micro Electro-Mechanical Systems (MEMS).

In MEMS, the signal-to-noise ratio (SNR) plays an important consideration in setting the threshold. For practical purposes, a SNR value of 1 is assumed. According to the statistical mechanics of one degree of freedom (d.o.f.) along the gravity radial direction, the equi-partition principle predicts the mean squares value of the forces due to excitation by acceleration of the proofing mass m with respect to the mean square value of the forces due to thermal agitation at temperature $$T.SNR \text{ per } d.o.f. = \frac{ma}{k_B T}, \quad (k_B = 1.38 \cdot 10^{-13} J/K$$

is the Boltzmann's constant). An important feature is that as the mass decreases, the SNR decreases. The situation is worsened by the so-called Johnson shot noise generated by the electronic circuits together with broadband (white) thermal noise manifesting and masking at the sensor's natural frequency. Then the combined thermal and Johnson noise is given as equivalent acceleration value floor for the designed sensor frequency band. Nevertheless, the worst situation is known that for small devices at room temperature, the 1/f noise becomes dominant in the g-AU measurements at low frequency, which is overcome by the following improvement.

In this disclosure, we have elucidated the important self-similarity attribute of all earthquake seismograms beyond the aforementioned traditional SNR consideration. Our understanding allows us to design a threshold signal processing firmware fitted to a set of g-AU embedded in MEMS for the data transmission autodial feature in all terrestrial towers of cellular phone delivery system. Mathematically, this unique self-similarity property of earthquakes is due to a stationary correlation function of the earth crust mantel stress sources: $<z(t)z(t+\tau)>=<z(0)z(\tau)>\cong$const.step($\tau$) represents a reproducibly persistent "unity step" constancy "const." within the sampling time interval. Thus, it reproduces the inverse frequency law of the power spectral density:

$$<|Z(f)|^2> \cong \frac{1}{f}, f << f_o,$$

according to Wiener-Khintchin de-convolution theorem by means of Riemann-Cauchy contour integral $\oint$ of a complex variable z=x+iy; i=$\sqrt{-1}$, the so-called the Fourier-Mellon inverse transformation:

$$<z(0)z(\tau)=\int df \exp(i2\pi f\tau)<|Z(f)|^2>=\oint dz \exp(i2\pi z\tau)\frac{1}{f} \cong \text{step}(\tau)$$

Consequently, it is not finer, the better it is. We have to avoid the correlation constancy. Given a specific local earthquake seismology statistics mean μ and variance σ, we shall not overly sample according to the critical Nyquist sampling frequency, to avoid small earthquake trembling, rather to make sure the imminent large earthquake beyond Richter scale 5. We will make the Nowcast by means of appropriate sparse sampling, guided by the lower bound of a few seconds for local firing of point warning to potentially save a half life's of the local mortality.

The final decision is made collectively by a higher order statistics called independent component analysis (ICA) for the blind sources separation (BSS) made through a distributed cellular phone sensory system.

Example

Figure 13:
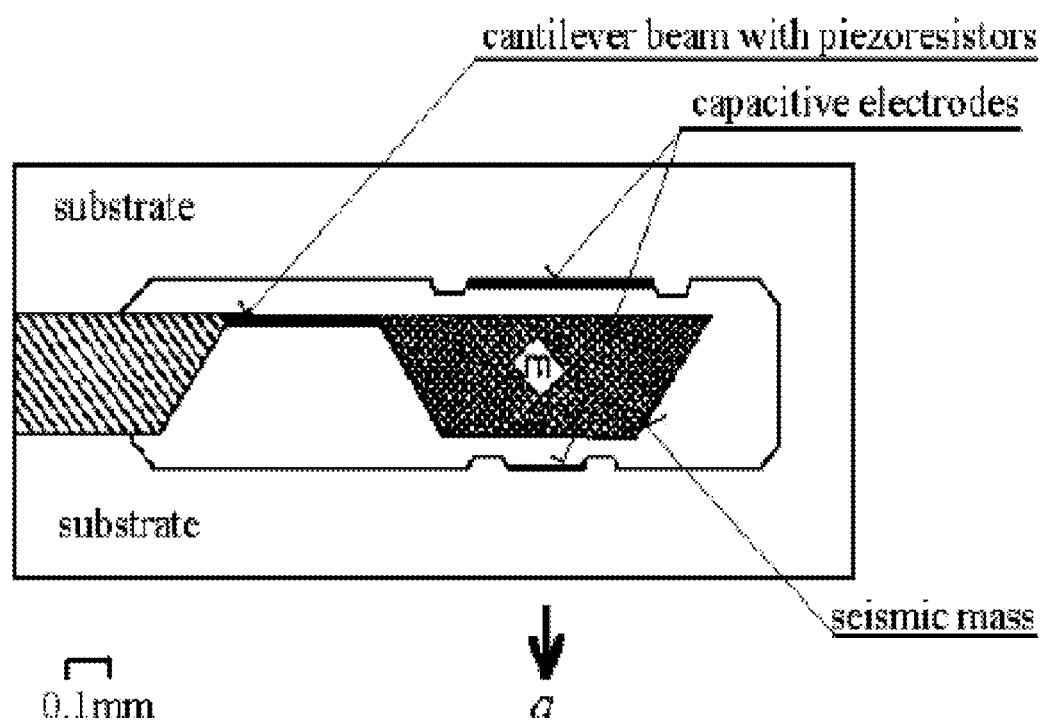
FIG. 13 shows exemplary COTS device architecture.

An ACU from a Geo Storm (i) We wish to indicate the state of the art in implementation or in firmware for an airbag triggering mechanism and the navigational inertial motion unit (IMU) so that indeed our simpler design is reduced to practice. For convenience, the COTS device architectures are shown in FIG. 13. (cf. http://www.motionnode.com/) with a standard firmware attribute table listed as follows:

Extremely small size (40 mm×40 mm×15 mm) and the cost is about $1K

Fully integrated accelerometer, gyroscope, and magnetometer solution

Surface mount MEMS sensor design for high accuracy and compact form

Real-time orientation output, half 180 degree range in all three axes

Sample rate: 50 to 100 Hz, by 10 Hz

USB connectivity for simple connection to a PC

Multiple devices can be connected to a PC through a USB hub

Each MotionNode sensor includes software for your PC. The software provides a simple interface to: Supports Windows, Linux, and Mac Operating Systems Configure your sensor(s)

Adjust sensitivity and filter parameters for different application requirements

Preview all output data in real-time

Record orientation and sensor data

Organize captured motion data and sensor streams for easy retrieval

Export motion capture data to standard file formats

The SDK is open source and available in the C++, C#, Java, and Python programming languages.

Figure 14:
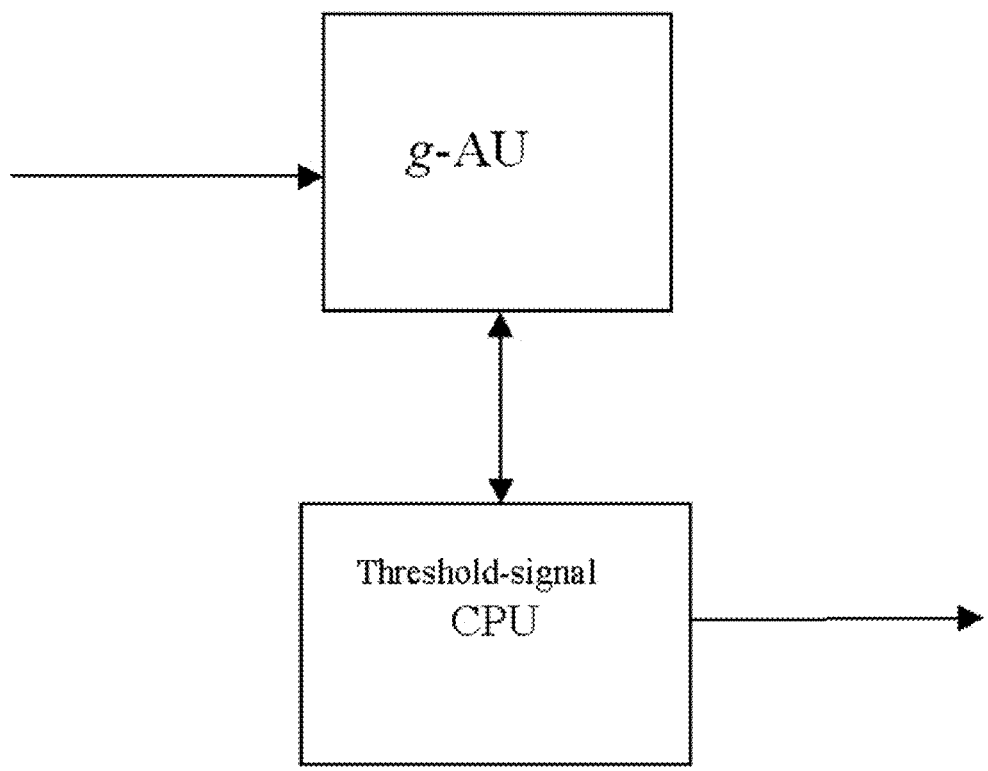
FIG. 14 is a block diagram of a hardware component of the invention.
Figure 15A:
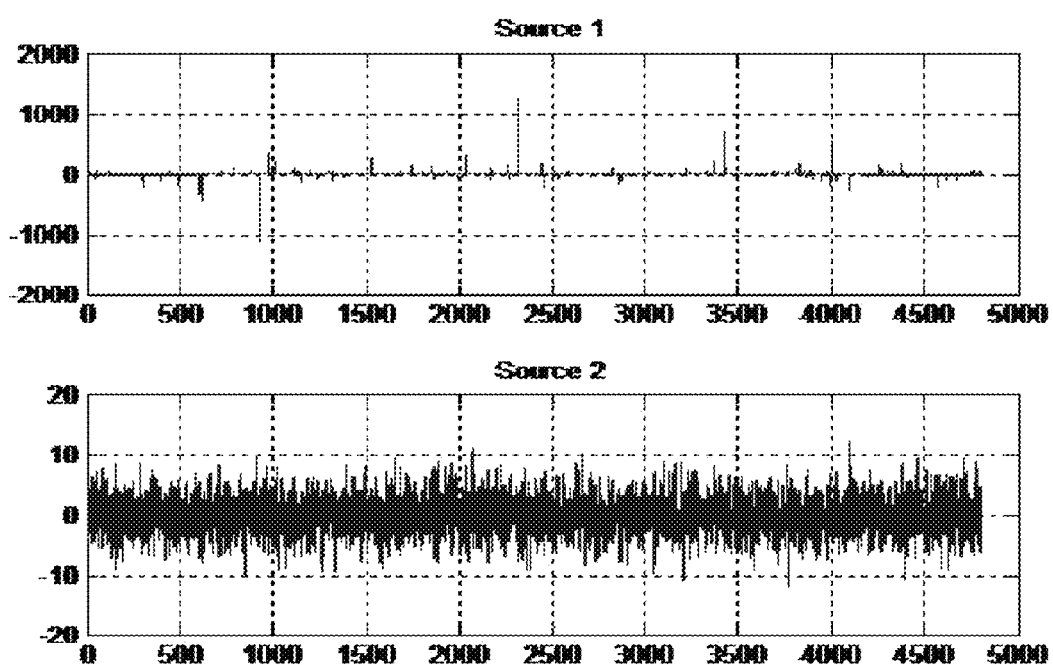
FIG. 15 show examples of sampling graphs.
Figure 15B:
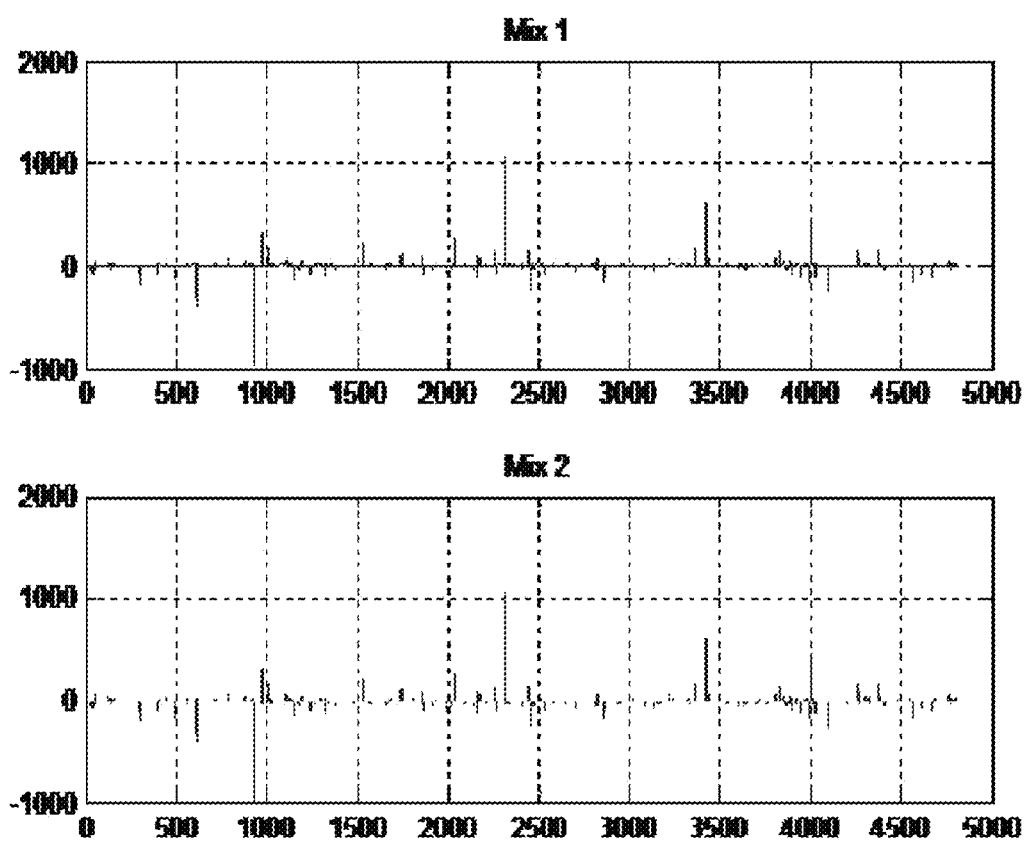
Figure 15C:
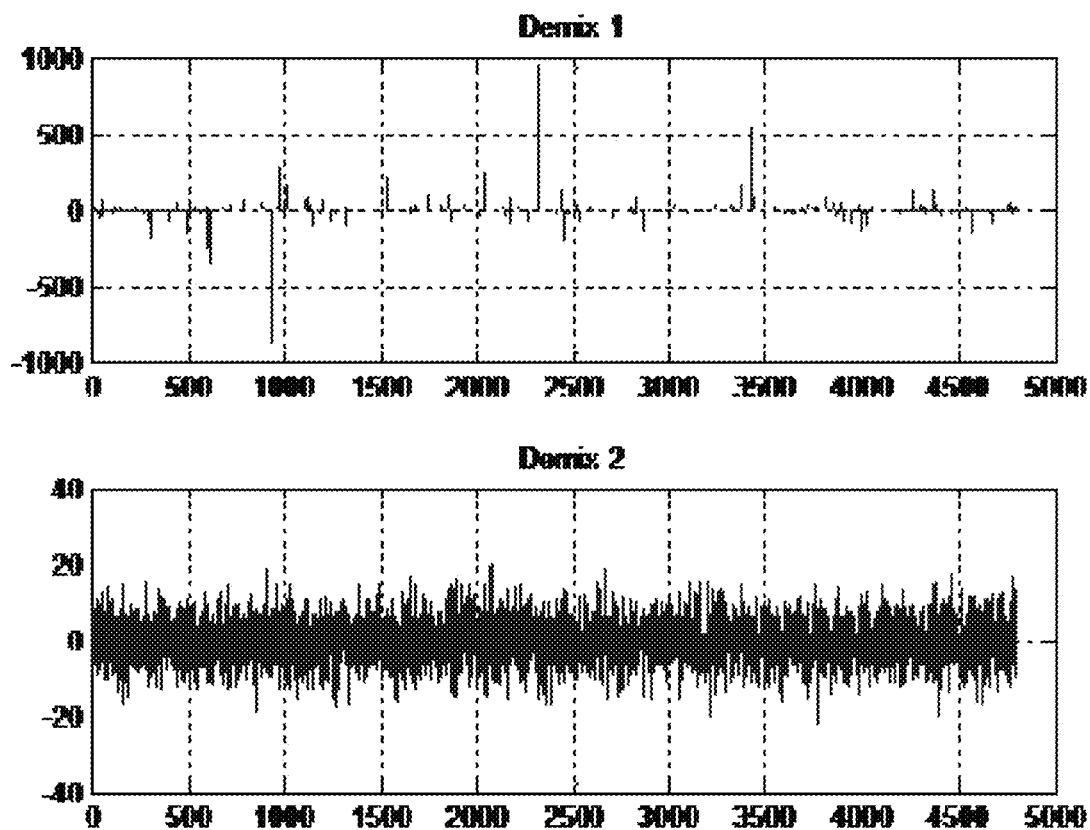

(ii) In FIG. 14 Block #1 is the z-directional gravitational g-accelerometer unit (g-AU) which is quite different from the original precision instrument made of 3D gyroscopes for the 3D navigation. We consider a micron miniaturization in MEMS made of an arbitrary fixed proving mass against the surrounding spring-cantilever made of a piezoelectric material that can convert the pressure of proving mass against the surround to the voltage for the read out. However, this box of COTS (commercial off the shelves) equipment can be simplified to be made adaptive to local geometric needs, according to a lookup table to be made to the need of local geological conditions. Block #2 is a threshold signal processing central processor unit (CPU) that belongs to field programmable gate array (FPGA) firmware. It can be tuned to a specific prerequisite for the sensitivity according to the local earthquake seismology statistics mean μ and variance σ. The device can adjust the effective density through the contact surface size of the proving mass with respect to the piezoelectric material. This may be equivalent to the adjustment of the so-to-speak density of material (as if from alumina to lead) in the relative measure of the Young's modulus of the stiffness of the surrounding piezoelectric material. The third component is augmented by a threshold linkage to a cellular phone auto dialing system.

(iii) Our processing algorithm is based on a higher order statistics (HOS) called the Kurtosis namely the 4th cumulant, which exceeds the threshold indicating the Signal to the Noise Ratio beyond Gaussian noise variance.

(iv) A necessary sampling rate of the g-AU data is demonstrated to be few Hz in few seconds, namely days above 1000 data for the stability of the Kurtosis value which is greater than zero. This provides us an equivalent tuning of the stiffness of g-AU readout.

I claim:

1. A method of forecasting naturally-occurring phenomena, comprising:
    taking localized measurements of the earth's gravitational force change;
    interpreting trends in the measurements;
    relating the trends to a naturally-occurring phenomenon of interest;
    predicting a likelihood of occurrence of the phenomenon of interest based on the relationship; and reporting on the likelihood of occurrence to interested parties.

2. The method of claim 1, wherein reporting, on the likelihood of occurrence to interested parties includes automatically reporting on the likelihood of occurrence to interested parties.

3. The method of claim 1, wherein the naturally-occurring phenomenon of interest is seismic activity.

4. The method of claim 1, wherein taking localized measurements of the earth's gravitational force change includes using inertial motion units to measure local changes.

5. The method of claim 4, wherein the inertial motion units are miniaturized inertial motion units.

6. The method of claim 4, the inertial motion units are micro-electro-mechanical devices.

7. The method of claim 1, wherein taking localized measurements of the earth's gravitational force change includes taking measurements from a point above the Earth's surface.

8. The method of claim 7, wherein the point above the Earth's surface is above the Earth's atmosphere.

9. The method of claim 1, wherein repotting on the likelihood of occurrence includes reporting via a wired communication system.

10. The method of claim 1, wherein reporting on the likelihood of occurrence includes reporting via a wireless communication system.

11. The method of claim 10, wherein the wireless communication system is a cellular telephone network.

12. The method of claim 1, wherein reporting on the likelihood of occurrence to interested parties includes providing information regarding potential seismic activity as forecast information to emergency bulletin sources.

13. The method of claim 1, wherein interpreting trends in the measurements includes determining blind source separation information directed to the region underneath the Earth's mantle crust.

14. The method of claim 13, wherein relating the trends to a naturally-occurring phenomenon of interest includes using the blind source separation information to make determinations regarding composition and/or movement below the Earth's mantle crust.

15. An apparatus adapted to forecast naturally-occurring phenomena, comprising:

a device adapted to take localized measurements of the earth's gravitational force change;

a computing device including instructions to interpret trends in the measurements, to relate the trends to a naturally-occurring phenomenon of interest, and to predict a likelihood of occurrence of the phenomenon of interest based on the relationship; and a communications system adapted to report on the likelihood of occurrence to interested parties.

16. The apparatus of claim 15, wherein the communications system is adapted to automatically report on the likelihood of occurrence to interested parties.

17. The apparatus of claim 15, wherein the naturally-occurring phenomenon of interest is seismic activity.

18. The apparatus of claim 15, wherein the device adapted to take localized measurements of the earth's gravitational force change includes an inertial motion unit.

19. The apparatus of claim 18, wherein the inertial motion unit is a miniaturized inertial motion unit.

20. The apparatus of claim 18, wherein the inertial motion unit is a micro-electro-mechanical device.

21. The apparatus of claim wherein the device adapted to take localized measurements of the earth's gravitational force change is disposed at a point above the Earth's surface.

22. The apparatus of claim 21, wherein the point above the Earth's surface is above the Earth's atmosphere.

23. The apparatus of claim 15, wherein the communications system includes a wired communication system.

24. The apparatus of claim 15, wherein the communications system includes a wireless communication system.

25. The apparatus of claim 24, wherein the wireless communication system includes a cellular telephone network.

26. The apparatus of claim 15, wherein the communications system includes emergency bulletin sources.

27. The apparatus of claim 15, wherein the instructions to interpret trends in the measurements include instructions to determine blind source separation information directed to the region underneath the Earth's mantle crust.

28. The apparatus of claim 27, wherein the instructions to relate the trends to a naturally-occurring phenomenon of interest includes instructions to use the blind source separation information to make determinations regarding composition and/or movement below the Earth's mantle crust.

* * * * *